United States Patent [19]
Trinkner et al.

[11] Patent Number: 5,928,535
[45] Date of Patent: Jul. 27, 1999

[54] FUEL TANK FILLER ASSEMBLY FOR ENGINE DRIVEN WELDER

[75] Inventors: Michael J. Trinkner, Appleton; Mark E. Peters, Menasha; David E. Radtke, Appleton, all of Wis.

[73] Assignee: Miller Electric Manufacturing Co., Appleton, Wis.

[21] Appl. No.: 08/853,053

[22] Filed: May 8, 1997

[51] Int. Cl.⁶ .................................................. B23K 9/00
[52] U.S. Cl. .......................................... 219/133; 290/1 A
[58] Field of Search ................................ 219/133; 123/3; 220/86.1, 86.2; 290/1 A, 1 R; 322/1

[56] References Cited

U.S. PATENT DOCUMENTS

| | | | |
|---|---|---|---|
| 2,177,687 | 10/1939 | Bracken et al. | 290/1 A |
| 4,465,920 | 8/1984 | Hoyt, Jr. et al. | 219/133 |
| 4,595,841 | 6/1986 | Yaguchi | 290/1 A |
| 4,702,201 | 10/1987 | Odo et al. | 290/1 A |
| 4,703,867 | 11/1987 | Schoenhard | 220/85 F |
| 4,759,458 | 7/1988 | Fischer | 220/86 R |
| 4,768,566 | 9/1988 | Ito et al. | 141/46 |
| 4,798,182 | 1/1989 | Ebinuma et al. | 123/195 R |
| 5,033,521 | 7/1991 | Martin | 141/337 |
| 5,094,315 | 3/1992 | Taki et al. | 180/219 |
| 5,127,432 | 7/1992 | Duhaime | 137/574 |
| 5,133,588 | 7/1992 | Hutchinson et al. | 297/217 |
| 5,183,087 | 2/1993 | AUbel et al. | 141/59 |
| 5,275,213 | 1/1994 | Perkins | 141/59 |
| 5,320,147 | 6/1994 | Jamrog | 141/312 |
| 5,344,038 | 9/1994 | Freeman et al. | 220/453 |
| 5,385,178 | 1/1995 | Bedi | 141/59 |
| 5,390,808 | 2/1995 | Choma et al. | 220/86.2 |
| 5,437,317 | 8/1995 | Takatsuka et al. | 141/312 |
| 5,590,806 | 1/1997 | Green et al. | 220/86.2 |
| 5,662,149 | 9/1997 | Armellino | 220/86.2 |

FOREIGN PATENT DOCUMENTS 23 53 448  4/1975  Germany.

OTHER PUBLICATIONS

Form IM511–A—Ranger 9—Operator's Manual by Lincoln Electric—May 1995—5 pages.
Miller Owner's Manual—Big 40—Diesel—By Miller Electric—Oct. 1996—41 pages.
Miller Owner's Manual—Bobcat 225G Plus—By Miller Electric—Sep. 1996—30 pages.

*Primary Examiner*—Clifford C. Shaw
*Attorney, Agent, or Firm*—Mark W. Croll; Thomas W. Buckman; John P. O'Brien

[57] ABSTRACT

An engine driven welder has a fuel tank with a filler tube that extends upwardly from a reservoir in the machine base. The filler tube upper end and a cap thereon are below the machine top cover. The machine top cover has a cutout into which is installed a grommet that closes the cutout and that fully protects the filler tube upper end and the cap. The grommet has a hole that seals over a top portion of the filler tube such that any spilled fuel does not leak inside the machine. The filler tube has an expansion space that prevents splashback and spillover during fueling. An angled tail pipe directs engine exhaust away from the welding machine in any desired direction.

19 Claims, 2 Drawing Sheets

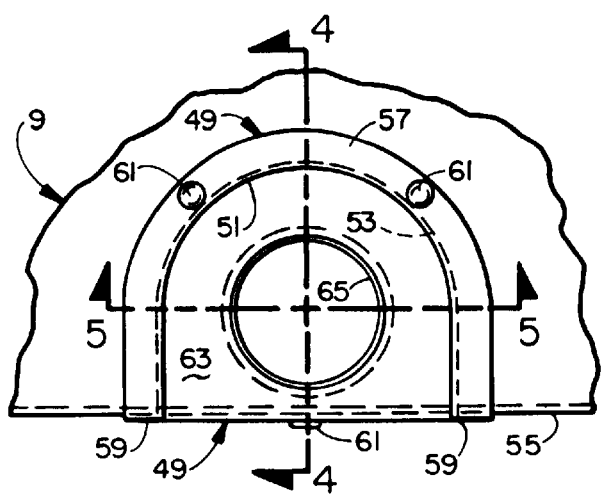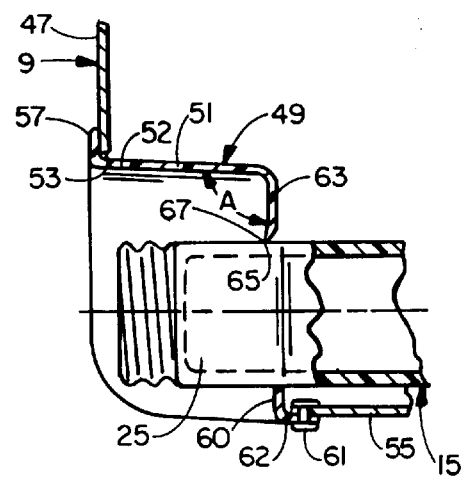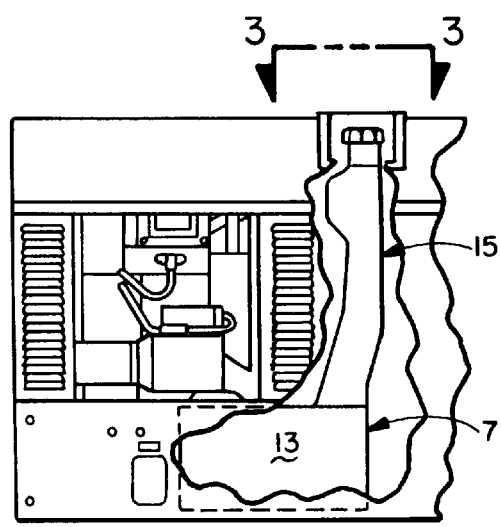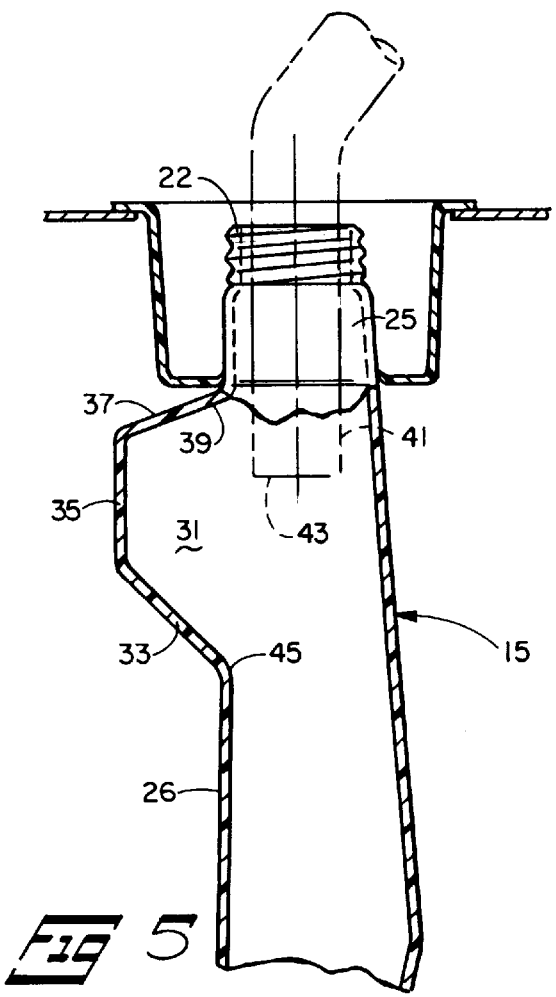

FUEL TANK FILLER ASSEMBLY FOR ENGINE DRIVEN WELDER

BACKGROUND OF THE INVENTION

This invention pertains to engine driven welding machines, and more particularly to tanks that hold fuel for welding machine engines.

DESCRIPTION OF THE PRIOR ART

A vital part of every engine driven welding machine is the tank that holds the fuel for the engine. In prior engine driven welding machines, the fuel tank was located entirely within the base of the machine. A filler hole was provided in a top wall of the tank. A suitable cap removably closed the filler hole. By removing the cap, a fuel nozzle could be inserted into the tank through the filler hole.

Although the prior fuel tanks served their intended purpose, they possessed certain disadvantages. For example, the top wall of the tank, and thus the filler hole, was at a low height on the welding machine, often only several inches above the floor. Consequently, a person filling the fuel tank was required to bend over to insert the fuel nozzle into the filler hole. A related drawback was that there was very little warning given to the person that the tank was approaching a full condition. As soon as the tank was filled up to the top wall, which was difficult to observe, any additional fuel would spill out the filler hole. The spilled fuel would run down the sides of the fuel tank and into the welding machine base, where it was impractical to wipe up. Fill gauges were often incorporated into the fuel tanks, but they were not sufficiently sensitive to indicate a full tank condition quickly enough to prevent spillover. Also, the filler hole was on one side of the welding machine, so that side of the machine could not be mounted against a wall.

In some applications, fuel tanks have been rendered more convenient to fill by making them with long filler tubes and by locating the filler tube opening so as to be easily accessible. A long filler tube has the additional advantage of providing a storage space for excess fuel that is delivered after the tank is full but before the fuel delivery pump is stopped, provided there were no leaks in the filler tube or in the junction between the filler tube and the tank. However, a long filler tube presents the potential problem of a buildup of air pressure within the tank during rapid filling. If the filling is suddenly stopped, the air pressure can force any fuel in the filler tube back up and out the opening, thereby spilling fuel and possibly even spraying it on the person filling the tank. The reduced diameter of the filler tube also created a high velocity of fuel moving up the tube during filling that could easily spill if not shut off in time.

It is known to provide engine driven welding machines with fuel tanks having long filler tubes. However, the tops of the filler tubes and their caps were exposed above the top of the welding machine cover.

U.S. Pat. Nos. 4,759,458 and 5,320,147 and German patent 23 53 448 show filler tubes that have enlargements near their respective openings. The enlargements serve as chambers for temporarily storing fuel that is forced back out the filler tubes by air pressure inside the fuel tank. The arrangement of U.S. Pat. No. 4,759,458 also includes lines that vent air in the tank to the filler tube chamber.

Although the designs of some prior fuel tanks possess certain desirable characteristics, there nevertheless is room for further advancements in fuel tank design.

SUMMARY OF THE INVENTION

In accordance with the present invention, a fuel tank filler assembly for engine driven welders is provided that combines anti-splashback with protective and aesthetic features. This is accomplished by apparatus that includes a grommet that fits in a welding machine cover and over a fuel tank filler tube a short distance above an expansion space in the filler tube.

The grommet has a bent side wall, which may be U-shaped, with top, bottom, and front edges. The space between the side wall is closed along its bottom edge with a flat bottom wall. The side wall front and top edges are turned outwardly to form flanges. The edge of the bottom wall not surrounded by the side wall has a downturned flange. The grommet bottom wall has a hole through it that is defined by a flexible lip.

The fuel tank filler tube has a lower end that opens into a reservoir, with the filler tube and the reservoir being made of one piece of polymeric material. The reservoir fits neatly within the welding machine base. An upper end of the filler tube is approximately at waist height to a person. The filler tube has a variable cross section and is configured to clear various components inside the welding machine. The top cover on the welding machine is cut out over the filler tube upper end.

The grommet is attached to the welding machine top cover so as to fit within the cutout therein. When the grommet is in place, its flanges overlie the welding machine top cover, but its bottom wall is located below the machine top cover. The hole in the grommet bottom wall fits over a circular top portion of the fuel tank filler tube. The outer diameter of the filler tube top portion is slightly larger than the inner diameter of the lip of the grommet hole. Consequently, the grommet lip bends slightly as the grommet is fit over the filler tube, thereby creating a tight seal between the filler tube and the grommet. The filler tube upper end and its cap are below the machine top cover.

The filler tube expansion space is below the grommet bottom wall. The expansion space protrudes from one side of the filler tube. The cross sectional area of the expansion space is greater than the area of the filler tube immediately below the expansion space. Accordingly, any potential splashback of the fuel up and out the filler tube during fuel delivery is prevented, because the fuel can temporarily accumulate in the expansion space. Similarly, the decreased velocity of the fuel rising in the filler tube when it reaches the expansion space gives an automatic fuel shut off valve sufficient time to react and stop the fuel flow, thus preventing spillover.

Further in accordance with the present invention, the combined functional and aesthetic features of the welding machine include its exhaust system. The exhaust system is designed such that the engine muffler is a short distance below the welding machine top cover. A muffler exhaust tube rises vertically out of the muffler. There is a hole through the top cover aligned with the muffler exhaust tube. A bent tail pipe is clamped to the muffler exhaust tube and protrudes through the hole in the top cover. By loosening the clamp, the tail pipe can be rotated 360 degrees about the muffler exhaust tube and then reclamped at any desired angular position. In that manner, a person can direct the exhaust gases from the engine in any desired direction.

The method and apparatus of the invention, using an expansion space on a filler tube that is protected at its upper end, thus enables a welding machine fuel tank to be filled with convenience and safety. Any fuel that does spill out of the filler tube is prevented by the grommet from running inside the machine.

Other advantages, benefits, and features of the present invention will become apparent to those skilled in the art upon reading the detailed description of the invention.

BRIEF DESCRIPTION OF THE DRAWINGS

FIG. 2 is a broken partial view of the assembled welding machine of FIG. 1, taken generally along line 2—2 of FIG. 1.

FIG. 3 is a view on an enlarged scale taken along line 3—3 of FIG. 2.

FIG. 4 is a partial cross sectional view taken along line 4—4 of FIG. 3.

FIG. 5 is a partial cross sectional view taken along line 5—5 of FIG. 3.

DETAILED DESCRIPTION OF THE PREFERRED EMBODIMENT

Figure 1:
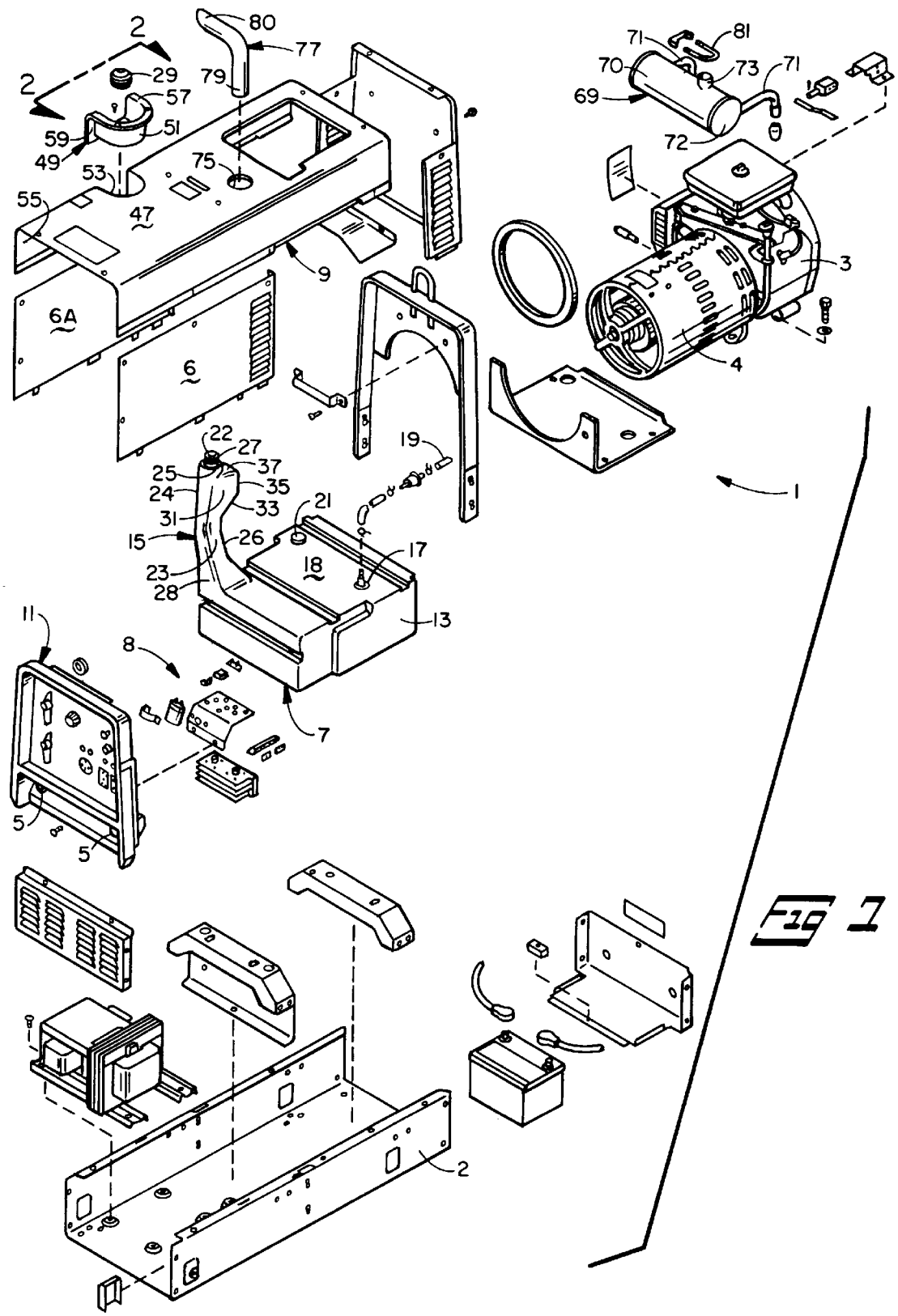
FIG. 1 is an exploded perspective view of a typical engine driven welding machine that includes the present invention.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring first to FIG. 1, an engine driven welding machine 1 is illustrated that includes the present invention. The welding machine 1 comprises a base 2 that supports an electric generator 4. The generator 4 is driven by an internal combustion engine 3. Electrical power from the generator is conditioned by known components, typically represented at reference numeral 8, to be suitable for welding use and available at terminals 5. Side covers 6 and 6A cover most of the sides of the welding machine. A top cover 9 and an end cover assembly 11 fit neatly with the side covers 6 and 6A to substantially enclose the working components of the welding machine.

In accordance with the present invention, fuel for the internal combustion engine 3 is stored in a novel fuel tank 7. The fuel tank 7 is comprised of a generally rectangular reservoir 13 and a filler tube 15. The reservoir 13 has six sides that are sized and shaped to fit within the welding machine base 2. There is a suitable opening 17 in the reservoir top side 18 to enable fuel to be pumped out through line 19 to the engine. Another opening 21 in the reservoir top side 18 accommodates a gauge.

The filler tube 15 of the fuel tank 7 extends upwardly from one corner of the reservoir to side 18. The filler tube 15 and the reservoir 13 are rotomolded of a polymeric material, preferably cross-linked H.D. polyethylene, so they are of one piece and won't leak at their junction. The filler tube terminates in an upper end 22 that is located below the top panel 47 of the welding machine top cover 9. The cross section of the filler tube is preferably rectangular for its full height so as to have an inside wall 23, an outside wall 24, a front wall 26, and a back wall 28. The shape and size of the filler tube cross section varies along its length. Particularly, the inside wall 23 is contoured in a concave shape so as to clear the generator 4. The upper end 22 of the filler tube is formed with external threads 27. A vent-type cap 29 is removably threadable onto the threads 27. Immediately below the threads is a circular top portion 25.

Next to the top portion 25 of the filler tube 15 is an expansion space 31. In the illustrated construction, the expansion space 31 is defined by a projection of the filler tube front wall 26. The expansion space 31 is in the form of a bottom angled wall 33, a short vertical wall 35, and a top angled wall 37. Also see FIGS. 2–5. The upper end 39 of the top angled wall 37 blends into the filler tube circular portion 25.

In FIG. 5, the filler tube cap 29 is shown removed from the filler tube 15, and a conventional fuel nozzle 41 is shown inserted into the filler tube upper end 22. It is highly desirable that the maximum insertion of the nozzle 41 be limited such that the nozzle end 43 is at a higher level within the filler tube than the junction 45 of the expansion space bottom angled wall 33 with the front wall 26.

The expansion space 31 serves to prevent spillover when filling the fuel tank 7 with the nozzle 41. The rapid rise of the fuel up the filler tube 15 after the reservoir 13 is full but before the nozzle is turned off is ameliorated by the expansion space. The increased area of the expansion space compared with the rest of the filler tube enables the velocity of the rising fuel to slow at the expansion space. Consequently, the automatic fuel shut off valve has a chance to turn off the fuel pump before the fuel spills out of the filler tube upper end 22. Similarly, the expansion space prevents fuel splashback due to confined air pressure within the reservoir when the nozzle is suddenly shut off after a time of rapid filling.

Further in accordance with the present invention, the convenience and aesthetics associated with the fuel tank 7 are greatly improved over prior fuel tanks. The circular top portion 25 of the filler tube 15, although below the top panel 47 of the welding machine top cover 9, is nevertheless easily accessible. As a result, the fuel tank can be filled without requiring a person to bend over to the base 2. To provide protection to the filler tube and cap, and to allow for reduced volume in shipping and storing stacked welding machines, while providing easy access to the filler tube, as well as to give a neat appearance to the welding machine 1, a grommet 49 is incorporated into the welding machine top cover. In the preferred embodiment, the grommet 49 has a U-shaped vertical wall 51 that fits into a complimentary cutout 53 in the top cover. The cutout 53 is centered on the fuel tank filler tube. The side panel 55 of the machine top cover is also cut out for a distance equal to the height of the grommet curved wall 51. A top flange 57 extends outwardly from a top edge of the grommet curved wall. Front flanges 59 extend outwardly from the front edges of the curved wall.

The grommet 49 also has a bottom wall 63 that joins to the curved wall bottom edge and that fills the area inside the curved wall 51. As best shown in FIG. 4, the bottom wall 63 makes an obtuse angle A with the apex 52 of the curved wall. A satisfactory angle A is approximately 94 degrees. The free end 60 of the bottom wall terminates in a downturned flange 62. The grommet bottom wall has a hole 65 therethrough. The hole 65 is defined by a flexible lip 67. The inner diameter of the lip 67 is slightly less than the outer diameter of the circular portion 25 of the fuel tank filler tube 15.

When installed in the cutout 53 in the welding machine top cover 9, the grommet 49 completely closes the cutout. The top flange 57 overlies the top cover top panel 47, and the front flanges 59 and 62 overlie the side panel 55. Three rivets 61 attach the grommet to the top cover.

To install the grommet 49 in the welding machine top cover 9, the grommet hole 65 passes over the fuel tank filler tube top portion 25. The lip 67 bends against the filler tube 15, as best shown in FIGS. 4 and 5, and thereby forms a fuel proof seal with the filler tube. Consequently, any fuel that might spill from the nozzle 41 during the fueling process will not leak inside the welding machine 1. Rather, the fuel will merely flow down the grommet angled bottom wall 63 and down the outside of the welding machine top cover 9 and side cover 6A, from which it can be easily cleaned. The grommet bottom wall is sufficiently below the top cover top panel 47 that the filler tube upper end 22 and the cap 29 are also below the top cover top panel. The filler tube upper end and the cap are surrounded on three sides and are thus fully protected by the grommet vertical wall 51.

The aesthetics of the welding machine 1, both from an appearance standpoint and from a functional standpoint, is further enhanced by the design of the exhaust system of the internal combustion engine 3. Returning to FIG. 1, an engine muffler 69 having a cylindrical portion 70 and opposed ends 72 is horizontally oriented and is located above the engine and directly under the welding machine top cover 9. There are two exhaust inlets 71 from the engine to the muffler 69. There is a single exhaust outlet tube 73 from the muffler cylindrical portion 70. The exhaust tube 73 is vertical and is aligned with a hole 75 in the top cover 9.

A tail pipe 77 has a lower end 79 that protrudes through the top cover hole 75 and fits loosely over the muffler exhaust tube 73. The tail pipe upper end 80 is bent at approximately 90 degrees to the lower end 79. The tail pipe can be rotated through 360 degrees about the muffler exhaust tube. A clamp 81 is used to clamp the tail pipe lower end to the muffler exhaust tube at any desired angular orientation. In that manner, the welding machine operator can direct the exhaust from the engine 3 in any desired direction.

Thus, it is apparent that there has been provided, in accordance with the invention, a fuel tank filler assembly for engine driven welders that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A filler assembly in an engine driven welding machine having a base, a generator, and a top cover, the filler assembly comprising a fuel tank having a reservoir that is located within the welding machine base and a filler tube upstanding from a top side of the reservoir, the fuel tank reservoir and filler tube being made of one piece, the filler tube having an upper end that is located proximate the welding machine top cover and that removably receives a cap, the filler tube defining an unvented expansion space that projects unidirectionally from the filler tube proximate the upper end thereof and below the welding machine top cover to provide an increased area within the filler tube, so that the velocity of fuel rising in the filler tube decreases at the expansion space and thereby reduces fuel splashback and spillover during fueling.

2. A filler assembly in an engine driven welding machine having a base, a generator, and a top cover, the filler assembly comprising a fuel tank having a reservoir that is located within the welding machine base and a filler tube upstanding from a top side of the reservoir, the fuel tank reservoir and filler tube being made of one piece, the filler tube having an upper end that is located proximate the welding machine top cover and that removably receives a cap, the filler tube, defining an expansion space that projects unidirectionally from the filler tube proximate the upper end thereof and below the welding machine top cover to provide an increased area within the filler tube, wherein:

a. the fuel tank filler tube has a rectangular cross section with front, back, and side walls; and b. the expansion space has a generally rectangular cross section and projects from the filler tube front wall, so that the velocity of fuel rising in the filler tube decreases at the expansion space and thereby reduces fuel splashback and spillover during fueling.

3. A filler assembly in an engine driven welding machine having a base, a generator, and a top cover, the filler assembly comprising a fuel tank having a reservoir that is located within the welding machine base and a filler tube upstanding from a top side of the reservoir, the fuel tank reservoir and filler tube being made of one piece, the filler tube having an upper end that is located proximate the welding machine top cover and that removably receives a cap, the filler tube, defining an expansion space that projects unidirectionally from the filler tube proximate the upper end thereof and below the welding machine top cover to provide an increased area within the filler tube, further comprising grommet means attached to the welding machine top cover for protecting the filler tube upper end and the cap, and cooperating with the fuel tank filler tube to prevent any spilled fuel from leaking inside the welding machine wherein the grommet means comprises a grommet with a curved wall with top, bottom, and front edges, a bottom wall joined to the curved wall bottom edge that fills the space between the curved wall and having a free edge, the bottom wall having a hole therethrough sized and located to fit over the fuel tank filler tube, outturned flanges along the curved wall top and front edges, and a downturned flange along the bottom wall free edge, so that the velocity of fuel rising in the filler tube decreases at the expansion space and thereby reduces fuel splashback and spillover during fueling.

4. The filler assembly of claim 3 wherein:

a. the fuel tank filler tube comprises a top portion proximate the upper end that has a circular shape with a predetermined outer diameter; and b. the hole in the grommet bottom wall is defined by a flexible lip having an internal diameter that is slightly less than the predetermined diameter, the grommet flexible lip bending and sealing against the filler tube top portion.

5. The filler assembly of claim 4 wherein the grommet curved wall has an apex between the front edges, and wherein the grommet bottom wall makes an obtuse angle with the apex of the curved wall.

6. The filler assembly of claim 5 wherein the obtuse angle is approximately 94 degrees.

7. The filler assembly of claim 3 wherein the grommet bottom wall is located below the machine top cover.

8. The filler assembly of claim 3 wherein the filler tube upper end and the cap are below the machine top cover and are fully protected by the grommet curved wall.

9. In combination with a welding machine having a generator mounted on a base, an internal combustion engine that drives the generator, and a top cover that at least partially encloses the generator and engine, a fuel tank filler assembly comprising a fuel tank having a reservoir located in the welding machine base and a filler tube having a lower end opening into the reservoir and an upper end below and accessible through the welding machine top cover, wherein:

a. the welding machine top cover has a cutout therein; and b. a grommet is installed in the top cover cutout, the grommet fitting over the fuel tank filler tube to enable the fuel tank to be filled without removing the grommet from the welding machine top cover, wherein the grommet comprises:

i. a curved wall having an apex and top, bottom, and front edges;

ii. out turned flanges on the curved wall top and front edges that overlie the welding machine top cover; and iii. a bottom wall joined to the curved wall bottom edge and filling the space between the curved wall, the bottom wall being located below the machine top cover and having a hole therethrough sized to fit over the fuel tank filler tube and a free end with a flange that overlies the welding machine top cover.

10. The combination of claim 9 wherein the grommet bottom wall makes an angle of between approximately 90 degrees and 100 degrees with the apex of the curved wall.

11. The combination of claim 9 wherein the hole in the grommet bottom wall is defined by a flexible lip that seals against a circular top portion of the fuel tank filler tube to thereby prevent any spilled fuel from leaking inside the welding machine.

12. The combination of claim 9 wherein the fuel tank filler tube comprises an expansion space located between the grommet and the reservoir.

13. The combination of claim 12 wherein:

a. the fuel tank filler tube has a generally rectangular cross section having four walls; and b. the expansion space has a generally rectangular cross section and projects unidirectionally from a selected one of the filler tube walls.

14. The combination of claim 9 wherein the fuel tank filler tube is formed with an expansion space adjacent the filler tube top portion and adjacent the grommet bottom wall.

15. The combination of claim 9 wherein:

a. a cap removably closes the filler tube upper end; and b. the filler tube upper end and the cap are below the welding machine top cover and are fully protected by the grommet.

16. In combination with a welding machine having a generator mounted on a base, an internal combustion engine that drives the generator, and a top cover that at least partially encloses the generator and engine, a fuel tank filler assembly comprising a fuel tank having a reservoir located in the welding machine base and a filler tube having a lower end opening into the reservoir and an upper end proximate to and accessible through the welding machine top cover, wherein:

a. the welding machine top cover has a hole therethrough; and b. the internal combustion engine comprises:

i. an engine muffler located adjacent the welding machine top cover;

ii. a vertical exhaust tube on the muffler and aligned with the hole in the welding machine top cover;

iii. a tail pipe having a first end loosely received on the muffler exhaust tube and a second end that makes an angle with the first end; and iv. clamp means for clamping the tail pipe first end to the muffler exhaust tube, so that the tail pipe can be positioned at any of 360 degrees around the muffler exhaust tube and then clamped thereto without repositioning the muffler to thereby enable the exhaust from the muffler to be directed in any desired direction away from the welding machine.

17. An engine driven welder comprising:

a. generator means for producing welding power;

b. an engine that drives the welding machine;

c. base means for supporting the generator and the engine;

d. cover means for at least partially enclosing the generator means and the engine and including a top cover having a hole therethrough;

e. tank means located in the base means for storing fuel for the engine;

f. horizontally oriented muffler means having a cylindrical portion with opposed ends and located adjacent the hole in the top cover for receiving exhaust gases from the engine through at least two exhaust inlets, and for discharging the exhaust gases through a single outlet that extends from the cylindrical portion; and g. tail pipe means protruding the hole in the top cover for rotating 360 degrees relative to the muffler about a vertical axis to direct exhaust from the muffler means outlet in any desired direction away from the welder.

18. The engine driven welder of claim 17 wherein:

a. the muffler means comprises a vertical exhaust tube aligned with the hole in the top cover; and b. the tail pipe means comprises:

i. a tail pipe having a first end loosely received on the muffler means exhaust tube, and a second end that is bent at a predetermined angle to the first end; and ii. clamp means for clamping the tail pipe to the muffler exhaust tube at the desired direction of the exhaust from the welding machine.

19. A filler assembly in an engine driven welding machine having a base, a generator, and a top cover, the filler assembly comprising a fuel tank having a reservoir that is located within the welding machine base and a filler tube upstanding from a top side of the reservoir, the fuel tank reservoir and filler tube being made of one piece, the filler tube having an upper end that is located below and is accessible through the welding machine top cover and that removably receives a cap, the filler tube defining an unvented expansion space that projects from the filler tube proximate the upper end thereof to provide an increased area within the filler tube, so that the velocity of fuel rising in the filler tube decreases at the expansion space and thereby reduces fuel splashback and spillover during fueling.

* * * * *

US005928535C1

(12) EX PARTE REEXAMINATION CERTIFICATE (5140th)

United States Patent
Trinkner et al.

(10) Number: US 5,928,535 C1
(45) Certificate Issued: Jul. 12, 2005

(54) FUEL TANK FILLER ASSEMBLY FOR ENGINE DRIVEN WELDER

(75) Inventors: Michael J. Trinkner, Appleton, WI (US); Mark E. Peters, Menasha, WI (US); David E. Radtke, Appleton, WI (US)

(73) Assignee: Illinois Tool Works Inc., Glenview, IL (US)

Reexamination Request:
No. 90/006,584, Apr. 4, 2003

Reexamination Certificate for:
Patent No.: 5,928,535
Issued: Jul. 27, 1999
Appl. No.: 08/853,053
Filed: May 8, 1997

(51) Int. Cl.[7] .................................................. B23K 9/00
(52) U.S. Cl. ....................................... 219/133; 290/1 A
(58) Field of Search .......................... 219/133; 290/1 A, 290/1 R; 220/86.1, 86.2; 322/1; 123/3

(56) References Cited

PUBLICATIONS

Form IM–455: Ranger 10 and Ranger 10–LX Operating manual, Lincoln Electric Company, pp. 1–7, no date available.

Form IM511–A: Ranger 9 Operator's Manual, Lincoln Electric Company, May 1995, pp. 1–5.

*Primary Examiner*—Jonathan Johnson

(57) ABSTRACT

An engine driven welder has a fuel tank with a filler tube that extends upwardly from a reservoir in the machine base. The filler tube upper end and a cap thereon are below the machine top cover. The machine top cover has a cutout into which is installed a grommet that closes the cutout and that fully protects the filler tube upper end and the cap. The grommet has a hole that seals over a top portion of the filler tube such that any spilled fuel does not leak inside the machine. The filler tube has an expansion space that prevents splashback and spillover during fueling. An angled tail pipe directs engine exhaust away from the welding machine in any desired direction.

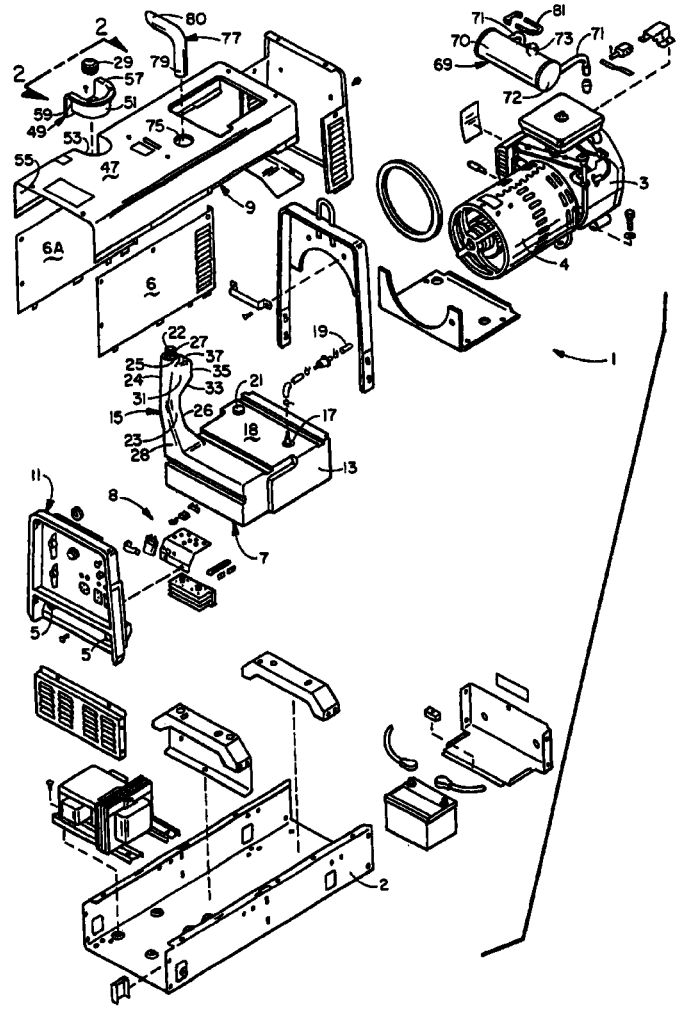

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 and 17–19 is confirmed.

Claim 16 is determined to be patentable as amended.

16. In combination with a welding machine having a generator mounted on a base, an internal combustion engine that drives the generator, and a top cover that at least partially encloses the generator and engine, a fuel tank filler assembly comprising a fuel tank having a reservoir located in the welding machine base and a filler tube having a lower end opening into the reservoir and an upper end proximate to and accessible through the welding machine top cover, wherein:

a. the welding machine top cover has a hole therethrough; and b. the internal combustion engine comprises:

i. an engine muffler located adjacent the welding machine top cover *and having a longitudinal axis transverse to a longitudinal axis of the internal combustion engine*;

ii. a vertical exhaust tube on the muffler and aligned with the hole in the welding machine top cover;

iii. a tail pipe having a first end loosely received on the muffler exhaust tube and a second end that makes an angle with the first end; and iv. clamp means for clamping the tail pipe first end to the muffler exhaust tube, so that the tail pipe can be positioned at any of 360 degrees around the muffler exhaust tube and then clamped thereto without repositioning the muffler to thereby enable the exhaust from the muffler to be directed in any desired direction away from the welding machine.

\* \* \* \* \*